United States Patent
Marsh et al.

(10) Patent No.: US 11,666,075 B2
(45) Date of Patent: Jun. 6, 2023

(54) DEFROSTING APPARATUS

(71) Applicant: BOSS DEFROST LLC, Denver, CO (US)

(72) Inventors: Mac Dillon Marsh, Sheridan, CO (US); Roger Frejus Abathan, Denver, CO (US)

( * ) Notice: Subject to any disclaimer, the term of this patent is extended or adjusted under 35 U.S.C. 154(b) by 219 days.

(21) Appl. No.: 17/171,761

(22) Filed: Feb. 9, 2021

(65) Prior Publication Data
US 2021/0161180 A1 Jun. 3, 2021

Related U.S. Application Data

(63) Continuation-in-part of application No. 16/036,173, filed on Jul. 16, 2018, now abandoned.

(60) Provisional application No. 62/625,343, filed on Feb. 2, 2018.

(51) Int. Cl.
| | |
|---|---|
| *A23L 3/365* | (2006.01) |
| *G08B 21/18* | (2006.01) |
| *A23L 3/00* | (2006.01) |
| *H04W 4/38* | (2018.01) |

(52) U.S. Cl.
CPC .............. *A23L 3/365* (2013.01); *A23L 3/001* (2013.01); *G08B 21/182* (2013.01); *H04W 4/38* (2018.02); *A23V 2002/00* (2013.01)

(58) Field of Classification Search
CPC ....... A23L 3/365; A23L 3/001; G08B 21/182; H04W 4/38; A23V 2002/00
See application file for complete search history.

(56) References Cited

U.S. PATENT DOCUMENTS

| | | | | |
|---|---|---|---|---|
| 2013/0323386 A1* | 12/2013 | Luketic | ................... | A23L 3/365 426/524 |
| 2015/0007588 A1* | 1/2015 | Cantrell | ................... | A23L 3/365 62/56 |
| 2015/0135974 A1* | 5/2015 | Ambrosi | ................. | A47J 36/24 99/483 |
| 2017/0082355 A1* | 3/2017 | Trout | .................... | F25D 31/007 |

FOREIGN PATENT DOCUMENTS

| | | | |
|---|---|---|---|
| CN | 203940080 U | * | 11/2014 |
| CN | 105831553 A | * | 8/2016 |
| CN | 205794727 U | * | 12/2016 |

* cited by examiner

*Primary Examiner* — Emmanuel E Duke
(74) *Attorney, Agent, or Firm* — Donald R. Boys; Central Coast Patent Agency LLC

(57) ABSTRACT

A defrosting apparatus has a foundation unit having a top surface and sidewalls, housing an electrically-powered water pump with an inlet and an outlet, with an opening in a sidewall enabling water to pass from outside the foundation unit to inside, a vertically oriented conduit extending from the top surface of the foundation unit, with a lower end connected to the outlet of the water pump, and an upper end, a horizontally-oriented conduit having a first and a second end, connected proximate the first end to the upper end of the vertically-oriented conduit, a vertically-oriented downspout connected at the second end of the horizontally-oriented, telescoping conduit assembly, the downspout open at a lower end, and a control unit comprising a CPU, a digital memory and wireless communication circuitry, the control unit coupled to a temperature sensor in contact with the flowing water, and to pump control inputs.

5 Claims, 5 Drawing Sheets

DEFROSTING APPARATUS

CROSS-REFERENCE TO RELATED APPLICATIONS

The present application claims priority to co-pending U.S. application Ser. No. 16/036,173 filed Jul. 16, 2018, which claims priority to Provisional Application 62/625,343, filed Feb. 2, 2018. The disclosure of the parent applications is incorporated in entirety at least by reference.

BACKGROUND OF THE INVENTION

1. Field of the Invention

The instant invention is in the field of apparatus useful for defrosting frozen food items and pertains more particularly to a portable apparatus for re-circulating water over a frozen food item.

2. Description of Related Art

Freezing food is a widespread practice for preserving food, and frozen food items have to be defrosted to be used. Common industry practice for defrosting frozen items include refrigerating at 40 degrees F. or running cold tap water over the frozen item. Both these methods have particular problems. When defrosting items in a refrigerator space that can be allocated for other storage is used. Defrosting food in a refrigerator is also time consuming. It can take up to several days to fully defrost frozen meat.

The practice of running cold tap water over frozen items to thaw is faster than the refrigeration practice but is also subject to specific problems. To safely defrost an item a continuous flow of cold tap water is necessary at or below seventy degrees Fahrenheit to avoid bacterial growth. Defrosting food in this manner is highly inefficient because copious amounts of water are wasted. On average, for every minute that a sink faucet is fully on 2 or more gallons of water may be used. To defrost one pound of meat using the running water method generally takes around one hour. So a great deal of water may be wasted in defrosting one pound of meat.

A culinary kitchen that defrosts with tap water typically uses approximately 17,700 gallons of water a month for defrosting. To comply with food and health regulations the water must be constantly moving and cannot be stagnant. The water also must be maintained at or below 70 F. as mentioned above.

What is clearly needed is a method and apparatus to defrost frozen food items safely and without wasting copious amounts of water.

BRIEF SUMMARY OF THE INVENTION

In an embodiment of the invention a defrosting apparatus is provided, comprising a foundation unit having a top surface and sidewalls, housing an electrically-powered water pump with an inlet and an outlet, the foundation unit having an opening in a sidewall enabling water to pass from outside the foundation unit to inside, a vertically oriented conduit extending from the top surface of the foundation unit, with a lower end connected to the outlet of the water pump, and an upper end, a horizontally-oriented conduit having a first and a second end, connected proximate the first end to the upper end of the vertically-oriented conduit, a vertically-oriented downspout connected at the second end of the horizontally-oriented, telescoping conduit assembly, the downspout open at a lower end, and a control unit comprising a CPU, a digital memory and wireless communication circuitry, the control unit coupled to a temperature sensor in contact with the flowing water, and to pump control inputs. Water from outside the foundation unit passes through the opening, is drawn into the inlet of the pump, is passed from the outlet of the pump to the lower end of the vertically-oriented conduit, passes upward to the horizontally-oriented conduit, and thence to the downspout, where the water flows out and down to be collected outside the foundation unit, available to pass again into the foundation unit through the opening, and wherein, in response to sensed temperature of the water, an alert is initiated as water temperature rises to at or above a preprogrammed temperature.

In one embodiment the preprogrammed temperature is 70 degrees Fahrenheit. Also, in one embodiment the apparatus further comprises a mobile device executing a mobile application, wherein the wireless communication circuitry transmits water temperature to the mobile application, and the mobile device displays the water temperature on a display of the mobile device. In one embodiment the mobile device initiates the alert for water temperature at or above a preprogrammed temperature. And in one embodiment the control unit records total time of use, volume of water pumped, and start and stop times for thawing cycles.

In one embodiment the mobile device has input/output features in an interactive interface enabling a user to start and stop the pump, to record nature and mass of foodstuff placed for defrosting, and volume and temperature of water pumped. Also, in one embodiment the mobile application may be enabled to record individual thawing cycles and to calculate, record and display total time of use, water saved, amount of food being thawed, and the average thawing time.

In another aspect of the invention a system for defrosting is provided, comprising a container holding water, having a bottom surface and container sidewalls, and a defrosting apparatus comprising a foundation unit having a top surface and sidewalls, housing an electrically-powered water pump with an inlet and an outlet, with an opening in a sidewall enabling water to pass from outside the foundation unit to inside, a vertically oriented conduit extending from the top surface of the foundation unit, with a lower end connected to the outlet of the water pump, and an upper end, a horizontally-oriented conduit having a first and a second end, connected proximate the first end to the upper end of the vertically-oriented conduit, a vertically-oriented downspout connected at the second end of the horizontally-oriented, telescoping conduit assembly, the downspout open at a lower end, and a control unit comprising a CPU, a digital memory and wireless communication circuitry, the control unit coupled to a temperature sensor in contact with the flowing water, and to pump control inputs. The defrosting apparatus is placed on the bottom surface of the container with the opening fully beneath an upper surface of the water, the water in the container is adjusted to a fill line in a side of the foundation unit, a frozen item to be defrosted is placed in the water submerged below the surface of the water in the container, and the pump is operated to re-circulate water from the container through the conduits to the downspout, and water from the downspout is directed over the frozen item to be defrosted.

In one embodiment the system further comprises a mobile device executing a mobile application, wherein the wireless communication circuitry transmits water temperature to the mobile application, and the mobile device displays the water temperature on a display of the mobile device. Also, in one embodiment the mobile device initiates the alert for water temperature at or above a preprogrammed temperature. In one embodiment the preprogrammed temperature is 70 degrees Fahrenheit.

In one embodiment the control unit records total time of use, volume of water pumped, and start and stop times for thawing cycles. In one embodiment the mobile device has input/output features in an interactive interface enabling a user to start and stop the pump, to record nature and mass of foodstuff placed for defrosting, and volume and temperature of water pumped. And in one embodiment the mobile application is enabled to record individual thawing cycles and to calculate, record and display total time of use, water saved, amount of food being thawed, and the average thawing time.

DETAILED DESCRIPTION OF THE INVENTION

Figure 1:
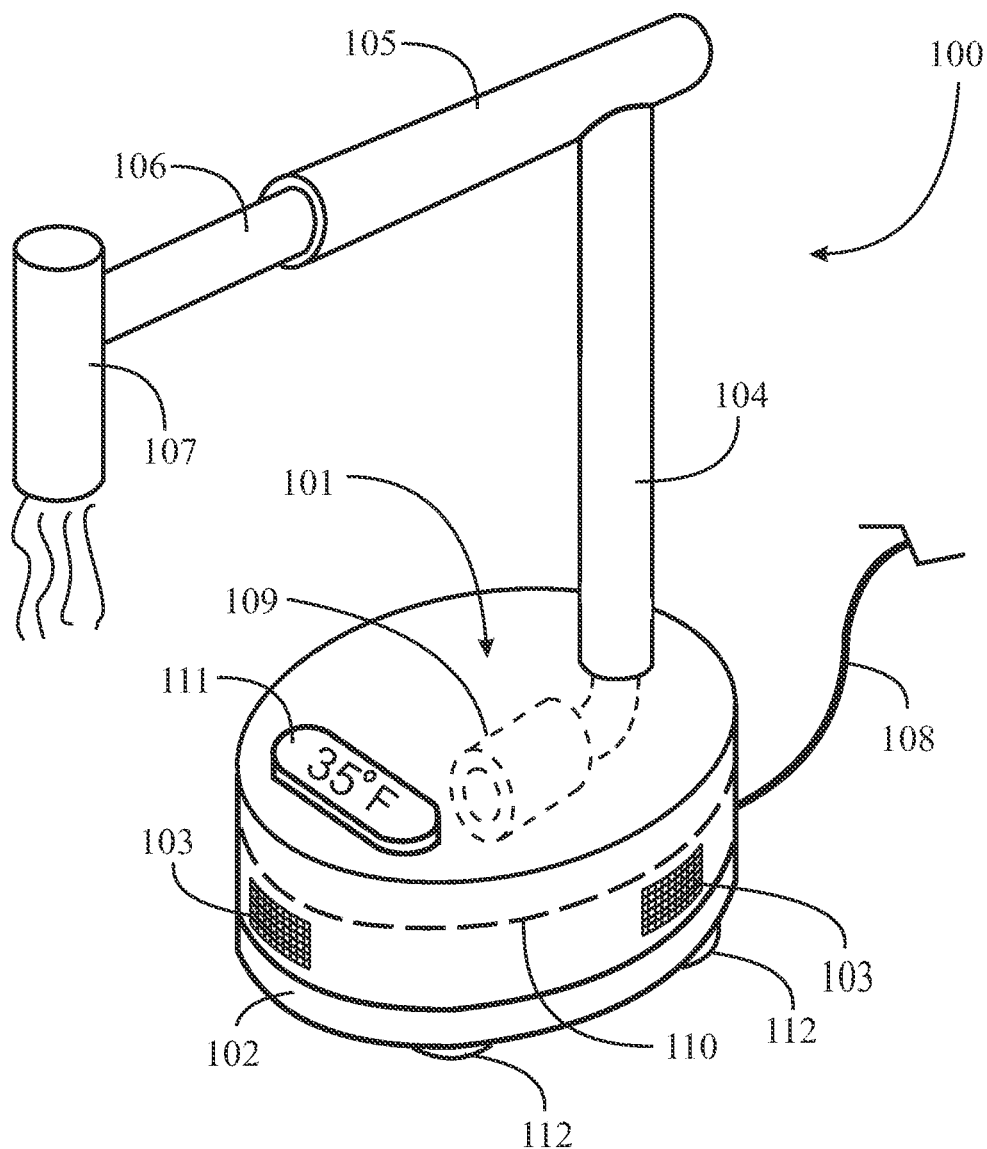
FIG. 1 is a perspective elevation view of an apparatus in an embodiment of the present invention.

FIG. 1 is a side elevation view of an apparatus 101 in an embodiment of the present invention, having a foundation unit 101 that has a base 102, a top and sidewalls. In one embodiment the foundation unit is round, as shown, of a diameter of about five to six inches, and has a height of about three inches. Foundation unit 101 houses an electrically-driven water pump 109, with an open inlet and an outlet connected to a vertically-oriented conduit 104. Foundation unit 101 resides in operation in water in an outside enclosure, not shown in FIG. 1. The sidewall of the foundation unit has openings 103 protected with screens that may be positioned at any desirable location in the sidewall. The foundation unit has a water line 110 to indicate depth of water to be provided in the outside enclosure. In operation pump 109 draws water from inside the foundation unit and urges the water upward through vertical conduit 104, which causes water to be drawn through screened openings 103.

Base 102 in some embodiments is a metal plate of a thickness to add a weight of perhaps a pound or more to the foundation unit. The purpose is to provide sufficient weight that the apparatus, resting on a surface of a large pan, a basin or a sink, to be stable, and not tend to float in the water. Weight might in other embodiments be provided in other ways, such as forming the top and sidewalls of the foundation unit of relatively heavy material with a substantial wall thickness. There are several ways sufficient weight may be provided.

In some embodiment of the invention suction cups 112 may be affixed to the bottom of the foundation unit in a manner that the cups may serve to anchor the foundation unit to a surface upon which the device may be placed. With the use of suction cups, extra weight to keep the unit stable may not be needed.

In this example embodiment vertical conduit 104 connects rotationally with a horizontal conduit 105, which mates, in some embodiments, telescopically with a second horizontal conduit 106. The telescoping engagement enables the overall length of conduits 105 and 106 together to be adjusted. But in some embodiments the horizontal conduit may be a single conduit that is not telescoping. IN the embodiment shown, conduit 106 connects with a downspout 107, which directs water urged by the pump downward over a frozen article not shown in FIG. 1. In FIG. 1 downspout 107 is illustrated as a separate conduit connected to conduit 106. However, in some embodiments, conduit 106 simply curves downward by ninety degrees at the outboard end, such that water coursing through conduit 106 is directed at a right angle downward.

In some embodiments of the invention vertical conduit 104 is rotatable in the top of foundation unit 101. In other embodiments vertical conduit 104 may be rigidly joined to the top of the foundation unit, but horizontal conduit 105 may be rotatable around a vertical axis of vertical conduit 104. In either case the telescoping arrangement of conduits 105 and 106 may be rotated to extend in different directions relative to the position of foundation unit 101. Further, in some embodiments conduit 106 may be rotatable in conduit 105, as well as linearly extensible and retractable. Also, the position of vertical conduit 104 relative to the top of the foundation unit may vary in different embodiments. In one embodiment vertical housing 104 may extend from a central point of the top of the foundation unit.

In operation knowledge of water temperature is important to maximize the defrost effect, so in some embodiments a thermometer 111 is provided on the foundation unit so a user may monitor the water temperature. Also, in some embodiments, circuitry is provided with a switch-enabled thermometer to shut off the pump if the water temperature reaches or exceeds a pre-set temperature, such as 70 degrees F., for example.

In some embodiments electrically driven pump 109 may be powered through an electrical cord from a wall outlet. In some other embodiments the pump may be powered by a battery, or a set of batteries, and in some embodiments the batteries may be rechargeable.

Figure 2:
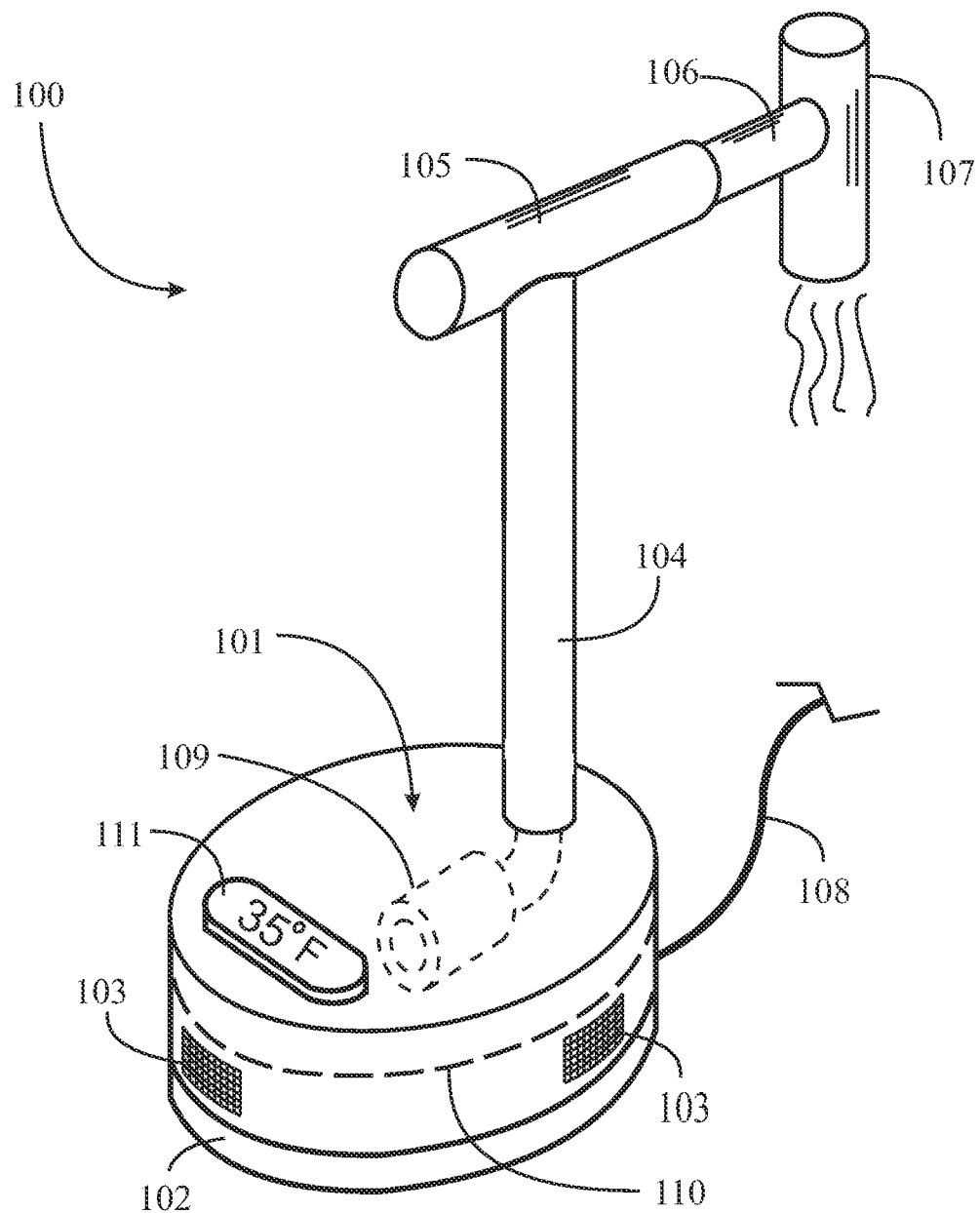
FIG. 2 is a perspective elevation view of the apparatus of FIG. 1 with elements rotated to a different position.

FIG. 2 is a perspective elevation view of the apparatus of FIG. 1 with elements rotated to a different position. In this example, the horizontal telescoping conduits have been rotated relative to the foundation unit to point in a different direction. In addition to pointing in a different direction, the horizontal combination of conduits 105 and 106 may be extended or retracted, so it may be seen that the combination of rotation and translation of the horizontal conduits enable positioning of downspout 107 at just about any point within a specific radius of the foundation unit.

Figure 3:
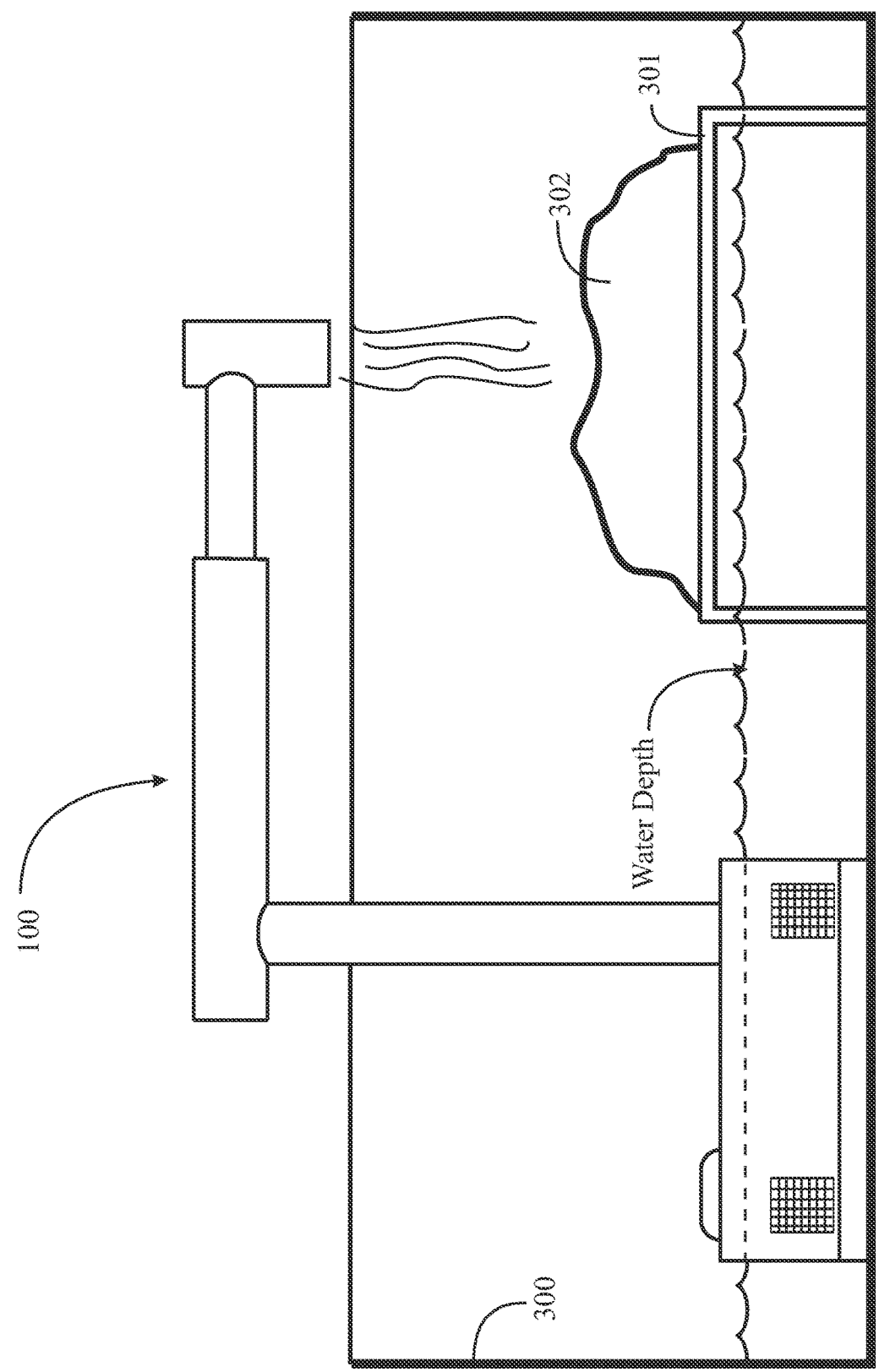
FIG. 3 is an elevation view of the apparatus of FIG. 1 and FIG. 2 in use.

FIG. 3 is an elevation view of the apparatus of FIG. 1 and FIG. 2 in use. In this example apparatus 100 is placed on the bottom of a pan, sink or basin 300, and a frozen item to be thawed 302 is placed on a bench or support 301 of a height that the frozen item is held above the surface of water added to the basin to the height of the visible water line on the foundation basis of apparatus 100. In this example, the purpose of the support bench is to keep the frozen item above the water level so water flowing over the item from apparatus 100 flows more or less uniformly over all the exposed surface of the frozen item. This may maximize the surface area exposed to the flowing water and enhances the process of thawing by virtue of maximized heat transfer.

In some embodiments the item to be thawed may be placed directly on the bottom of the basin, pan or sink. This is considered by many to be preferable, because there are, in some circumstances, concerns about the item being defrosted being exposed to air while being defrosted. It will be apparent to the skilled person that the position of the downspout may be adjusted to be directly over the item to be thawed. In operation a used will, as one example, place the apparatus of the invention on the floor of a sink, for example, and place a frozen item to be thawed in the sink away from the foundation element. The user may then adjust the position of the downspout to be over the item to be thawed. The frozen item may or may not be placed on a bench support. The user fills the sink to the indicated water line on the foundation element and starts the pump to begin the flow of water. It will be evident to the skilled person that the water is re-circulated, and not wasted, as in the prior art.

Another feature in some embodiments of the invention is construction of the assembly in a fashion that allows quick assembly and dis-assembly, which allows for regular cleaning, and in some cases sterilization.

Figure 4:
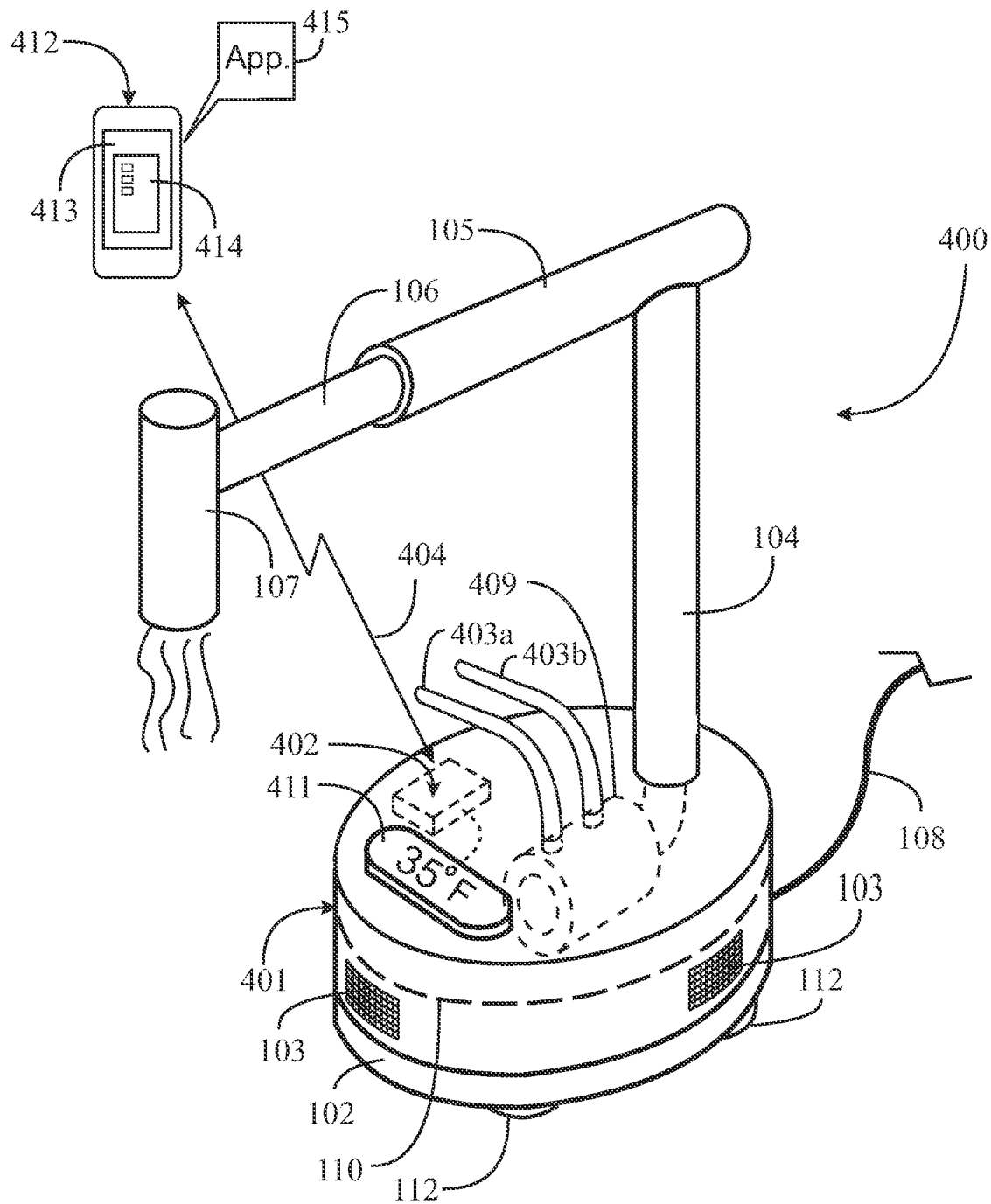
FIG. 4 is a perspective elevation view of an apparatus in a further embodiment of the present invention.

FIG. 4 is a perspective elevation view of an apparatus 400 in a further embodiment of the present invention. The freestanding apparatus 400 of FIG. 4 has a number of additional elements and is capable of more functions than the simpler apparatus of FIG. 1. Pump 409 of apparatus 400 is an air-cooled pump. There are inlet and outlet lines 403a and 403b that deliver air to the motor coils to keep the motor, and hence the pump, cool, so the pump does not tend to heat the water.

Apparatus 400 further comprises a control unit 402 which may comprise a CPU and digital memory, and also wireless communication circuitry. Control unit 402 is coupled to a temperature sensor measuring temperature of the water passing through the unit and the temperature is displayed on display 411. The circuitry includes a switch that may be adjusted to trigger an alarm at a preset temperature, which in some embodiments if 70 degrees F. In one embodiment the switch when closing also opens air circulation to pump 409 to cool the motor.

As mentioned above, control unit 402 may comprise wireless communication circuitry that may transmit signals 404 to a Smartphone 412 that may display the water temperature on a display 413. In one embodiment a Smartphone application 415 may generate input/output features in an interactive interface 414 enabling a user to start and stop the pump, to record nature and mass of foodstuff placed for defrosting, and volume and temperature of water pumped. In one embodiment the Smartphone app may be enabled to record and display total time of use, water saved, amount of food being thawed, and the average thawing time, Some of these data points will be calculated using on-board programming in the control unit or in the Smartphone application. This will give the user a good idea for when to pull the frozen food so its thawed-on time.

Figure 5:
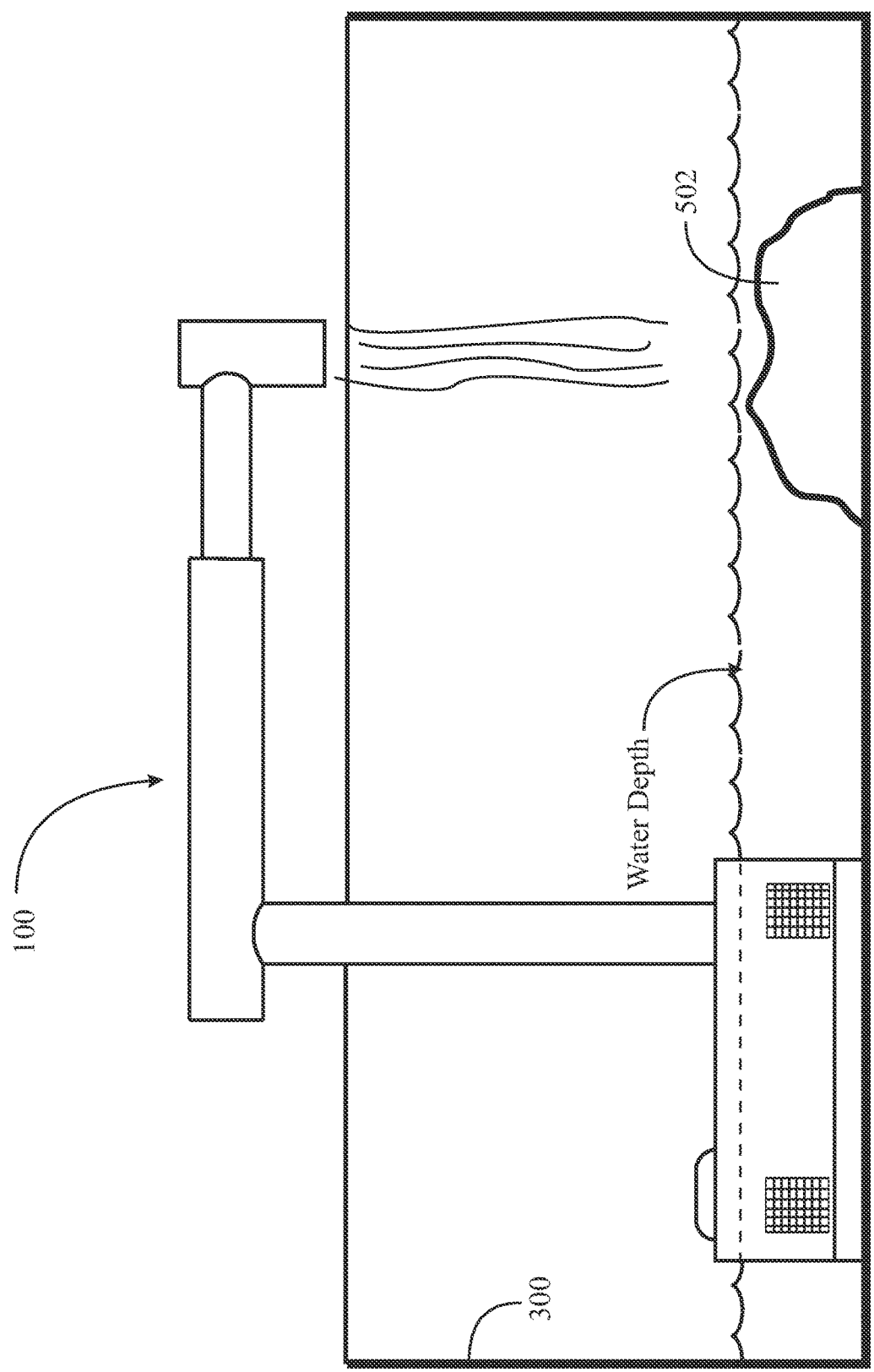
FIG. 5 is an elevation view showing an object frozen entity submerged.

FIG. 5 is an elevation view of apparatus 100, which may also be apparatus 400 of FIG. 4, illustrating thawing of a frozen entity 502 submerged beneath water in container 300. The water depth is to the fill line 10 of FIGS. 1 and 4. In preferred embodiments of the invention the items to be thawed, if foodstuff, must be fully submerged under the indicated fill line 110 of the apparatus when defrosting. This is to prevent to food being exposed to the ambient air temperature which might cause the frozen food to thaw at too rapid a rate potentially causing microbial growth.

It will be apparent to the skilled person that an apparatus for thawing according to an embodiment of the invention may take a number of forms and sizes within the breadth of the invention. The foundation element, for example, need not be round as shown in the figures, but may take other shapes. Different makes and models of pumps may be used. There may be one, or more than one opening to admit water to the inside of the foundation element to be available to the pump. Heights and horizontal reach may be different for different models of devices according to embodiments of the invention. The breadth of the invention is only limited by the claims that follow.

The invention claimed is:

1. A system for defrosting, comprising:
   a container holding water, having a bottom surface and container sidewalk; and
   a defrosting apparatus comprising a foundation unit having a top surface and sidewalk, housing an electrically-powered water pump with an inlet and an outlet, with an opening in a sidewall enabling water to pass from outside the foundation unit to inside, a vertically oriented conduit extending from the top surface of the foundation unit, with a lower end connected to the outlet of the water pump, and an upper end, a horizontally-oriented conduit having a first and a second end, connected proximate the first end to the upper end of the vertically-oriented conduit, a vertically-oriented downspout connected at the second end of the horizontally-oriented, telescoping conduit assembly, the downspout open at a lower end, and a control unit comprising a CPU, a digital memory and wireless communication circuitry, the control unit coupled to a temperature sensor in contact with the flowing water, and to pump control inputs;
   wherein the defrosting apparatus is placed on the bottom surface of the container with the opening fully beneath an upper surface of the water, the water in the container is adjusted to a fill line in a side of the foundation unit, a frozen item to be defrosted is placed in the water submerged below the surface of the water in the container, and the pump is operated to re-circulate water from the container through the conduits to the downspout, and water from the downspout is directed over the frozen item to be defrosted.

2. The system of claim 1 further comprising a mobile device executing a mobile application, wherein the wireless communication circuitry transmits water temperature to the mobile application, and the mobile device displays the water temperature on a display of the mobile device.

3. The system of claim 2 wherein the mobile device initiates the alert for water temperature at or above a preprogrammed temperature.

4. The system of claim 3 wherein the preprogrammed temperature is 70 degrees Fahrenheit.

5. The system of claim 2 wherein the mobile device has input/output features in an interactive interface enabling a user to start and stop the pump, to record nature and mass of foodstuff placed for defrosting, and volume and temperature of water pumped.

* * * * *